US008797318B2

(12) United States Patent
Yoo et al.

(10) Patent No.: US 8,797,318 B2
(45) Date of Patent: Aug. 5, 2014

(54) ORGANIC LIGHT EMITTING DIODE DISPLAY AND STEREOSCOPIC IMAGE DISPLAY USING THE SAME

(75) Inventors: Juhnsuk Yoo, Goyang-si (KR); Soojeong Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 577 days.

(21) Appl. No.: 13/213,794

(22) Filed: Aug. 19, 2011

(65) Prior Publication Data

US 2012/0050274 A1 Mar. 1, 2012

(30) Foreign Application Priority Data

Aug. 26, 2010 (KR) ........................ 10-2010-0082938

(51) Int. Cl.

| | |
|---|---|
| ***G06T 15/00*** | (2011.01) |
| ***G09G 3/20*** | (2006.01) |
| ***G06F 3/038*** | (2013.01) |
| ***G09G 5/00*** | (2006.01) |
| ***G06T 15/20*** | (2011.01) |
| ***G09G 3/00*** | (2006.01) |
| ***G09G 3/32*** | (2006.01) |

(52) U.S. Cl.

CPC .............. *G09G 3/3233* (2013.01); *G09G 3/003* (2013.01); *G09G 2300/0861* (2013.01); *G09G 2300/0852* (2013.01); *G09G 2320/043* (2013.01); *G09G 2300/0819* (2013.01); *G09G 2320/0252* (2013.01)

USPC ............. 345/419; 345/76; 345/204; 345/211; 345/213; 345/427

(58) Field of Classification Search

USPC ...................... 257/40; 345/39, 76, 78, 82, 92, 345/204–205, 211, 427, 690

See application file for complete search history.

(56) References Cited

U.S. PATENT DOCUMENTS

| | | | | |
|---|---|---|---|---|
| 2004/0263440 | A1* | 12/2004 | Kimura et al. | 345/76 |
| 2007/0242068 | A1* | 10/2007 | Han et al. | 345/427 |
| 2008/0001857 | A1* | 1/2008 | Yoo | 345/76 |
| 2009/0073092 | A1* | 3/2009 | Numao | 345/76 |
| 2009/0231308 | A1* | 9/2009 | Numao | 345/204 |
| 2009/0267936 | A1* | 10/2009 | Kwon | 345/213 |
| 2010/0309187 | A1* | 12/2010 | Kang et al. | 345/211 |

* cited by examiner

*Primary Examiner* — Quan-Zhen Wang
*Assistant Examiner* — Lin Li
(74) *Attorney, Agent, or Firm* — Birch, Stewart, Kolasch & Birch, LLP

(57) ABSTRACT

An organic light emitting diode (OLED) display and a stereoscopic image display using the OLED display are disclosed. The stereoscopic image display includes a display panel, which includes a plurality of pixels and displays left eye image data and right eye image data in a time division manner, liquid crystal shutter glasses including a left eye shutter and a right eye shutter, which are alternately opened and closed in synchronization with the display panel, a data driver for driving data lines of the display panel, and a gate driver for sequentially supplying a plurality of pairs of gate pulses to a plurality of pairs of gate lines of the display panel. Each of the pixels includes an OLED, a driving thin film transistor (TFT), first to fourth switch TFT, an emission TFT, and first and second capacitors.

17 Claims, 14 Drawing Sheets

ORGANIC LIGHT EMITTING DIODE DISPLAY AND STEREOSCOPIC IMAGE DISPLAY USING THE SAME

This application claims the benefit of Korean Patent Application No. 10-2010-0082938 filed on Aug. 26, 2010, which is incorporated herein by reference for all purposes as if fully set forth herein.

BACKGROUND OF THE INVENTION

1. Field of the Invention

Embodiments of the invention relate to a stereoscopic image display capable of implementing a three-dimensional stereoscopic image (hereinafter referred to as '3D image').

2. Discussion of the Related Art

A stereoscopic image display implements a 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is implemented using polarization glasses or liquid crystal shutter glasses.

The glasses type method is roughly classified into a first polarization filter method using a patterned retarder film and polarization glasses, a second polarization filter method using a switching liquid crystal layer and polarization glasses, and a liquid crystal shutter glasses method. In the first and second polarization filter methods, a transmission of the 3D image is low because of the patterned retarder film and the switching liquid crystal layer, each of which is disposed on the display panel to act as a polarizing filter.

In the liquid crystal shutter glasses method, a left eye image and a right eye image are alternately displayed on a display device every one frame, and left and right eye shutters of the liquid crystal shutter glasses are opened and closed in synchronization with the display timing of the left and right eye images to thereby implement the 3D image. The liquid crystal shutter glasses open only the left eye shutter during nth frame periods, in which the left eye image is displayed, and open only the right eye shutter during (n+1)th frame periods, in which the right eye image is displayed, thereby making a binocular parallax in a time-division manner.

The stereoscopic image display may include a hold type display device such as a liquid crystal display (LCD). The liquid crystal display holds data, that has been charged in a previous frame, because of the hold characteristic of liquid crystals, immediately before new data is written. However, 3D crosstalk seen as ghost images occurs in the liquid crystal display because of a slow response time of the liquid crystals at a time when the left eye image changes into the right eye image or at a time when the right eye image changes into the left eye image.

The stereoscopic image display using the liquid crystal display as the display device adopts a high-speed driving method shown in FIG. 1, so as to reduce the 3D crosstalk. As shown in FIG. 1, the high-speed driving method multiplies an input frame frequency 'f' (unit: Hz) by 4 and shortens a data addressing time, so as to secure a sufficient reaction time of liquid crystals irrespective of a location of the liquid crystals in a display panel of the display device in consideration of a response time of the liquid crystals. In other words, the high-speed driving method addresses left eye image data L to the display device during an (n+1)th frame (Fn+1) corresponding to a period of ¼f and again addresses the same left eye image data L to the display device during an (n+2)th frame (Fn+2) corresponding to the period of ¼f. After a sufficient period of time passed, the high-speed driving method opens (i.e., ON) a left eye shutter STL of a liquid crystal shutter glasses. A viewer watches a left eye image in a short period of time after the response of the liquid crystals has been completed in the (n+2)th frame (Fn+2). Further, the high-speed driving method addresses right eye image data R to the display device during an (n+3)th frame (Fn+3) corresponding to the period of ¼f and again addresses the same right eye image data R to the display device during an (n+4)th frame (Fn+4) corresponding to the period of ¼f. After a sufficient period of time passed, the high-speed driving method opens (i.e., ON) a right eye shutter STR of the liquid crystal shutter glasses. The viewer watches a right eye image in a short period of time after the response of the liquid crystals has been completed in the (n+4)th frame (Fn+4). Although the high-speed driving method is adopted, it is difficult to secure a sufficient opening time of the left and right eye shutters STL and STR because of a slow response time of the liquid crystals. Therefore, the stereoscopic image display using the liquid crystal display as the display device greatly reduces a luminance of a 3D image when the 3D image is implemented.

Accordingly, a stereoscopic image display using an organic light emitting diode (OLED) display as the display device has been recently introduced. The OLED display includes an organic light emitting diode (OLED), which emits light by itself using a driving current flowing in a driving thin film transistor (TFT). Hence, the OLED display has advantages such as a faster response time, more excellent light emission efficiency, and a higher luminance than the liquid crystal display. However, the OLED display has the following problems.

Firstly, a driving current Ioled determining a light emission luminance of the OLED of the OLED display greatly varies when a threshold voltage Vth of the driving TFT varies as shown in FIG. 2, and when a potential of a low potential driving voltage Vss varies as shown in FIG. 3. The threshold voltage Vth of the driving TFT is shifted to the positive or negative direction due to a gate-bias stress or element characteristic. The positive shift of the threshold voltage Vth may be compensated using a known diode-connection method. However, it is difficult to compensate for the negative shift of the threshold voltage Vth using the known diode-connection method. The potential of the low potential driving voltage Vss varies because of a RC delay inside the display panel. A difference between the threshold voltages Vth of pixels and/or a difference between the low potential driving voltages Vss of the pixels cause a luminance difference between the pixels, thereby degrading the display quality of the stereoscopic image display.

Secondly, as shown in FIG. 4, the OLED display applies a data voltage Vdata to a gate electrode of the driving TFT and also compensates for the threshold voltage Vth of the driving TFT during a period T (i.e., a high logic period of a gate pulse), in which a switching TFT connected to the driving TFT is turned on. In the OLED display, one vertical period is determined by a frame frequency. Therefore, as the frame frequency increases, a turn-on period T of the switching TFT decreases. A reduction in the turn-on period T of the switching TFT results in a reduction in a charging period of the data voltage Vdata, thereby causing the bad charge. Further, a reduction in a compensation period of threshold voltage Vth of the driving TFT results in the bad compensation. It is difficult to adopt the high-speed driving method to the related art OLED display because of these reasons.

SUMMARY OF THE INVENTION

Embodiments of the invention provide an organic light emitting diode (OLED) display and a stereoscopic image display using the same capable of reducing 3D crosstalk, minimizing a luminance reduction, compensating for changes in a threshold voltage of a driving TFT and changes in a low potential driving voltage, and performing a high-speed driving method.

In one aspect, there is an OLED display comprising an organic light emitting diode (OLED) configured to emit light using a driving current flowing between an input terminal of a high potential driving voltage and an input terminal of a low potential driving voltage, a driving thin film transistor (TFT) including a gate electrode connected to a first node and a source electrode connected to a third node, the driving TFT controlling the driving current based on a voltage between the gate electrode and the source electrode, a first switch TFT configured to switch on or off a current path between a data line and the first node in response to a first gate pulse of a pair of gate pulses, a second switch TFT configured to switch on or off a current path between the third node and the input terminal of the low potential driving voltage in response to the first gate pulse, a third switch TFT configured to switch on or off a current path between a reference voltage supply line and a second node in response to a second gate pulse of the pair of gate pulses, a fourth switch TFT configured to switch on or off a current path between the first node and the second node in response to an emission pulse, an emission TFT configured to switch on or off a current path between the third node and the input terminal of the low potential driving voltage in response to the emission pulse, a first capacitor connected between the second node and the third node, and a second capacitor connected between the first node and the second node.

During an address period, the first and second gate pulses are held at a turn-on level, and the emission pulse is held at a turn-off level. During a programming period following the address period, the second gate pulse is held at the turn-on level, and the first gate pulse and the emission pulse are held at the turn-off level. During an emission period following the programming period, the first and second gate pulses are held at the turn-off level, and the emission pulse is held at the turn-on level.

During the address period, the first node is charged to a data voltage, the second node is charged to a reference voltage, and the third node is charged to a variation amount of the low potential driving voltage. Further, the first capacitor stores a value obtained by subtracting the low potential driving voltage variation amount from the reference voltage. Further, a potential of the data voltage is previously set to an addressing level obtained by subtracting a relatively low data adjustment voltage from the reference voltage.

During the programming period, a voltage of the first node is held at the addressing level by the second capacitor, a voltage of the second node is held at the reference voltage, and a voltage of the third node increases to a first programming level obtained by subtracting a threshold voltage of the driving TFT from the addressing level and is held at the first programming level. Further, the first capacitor stores a second programming level obtained by adding the data adjustment voltage to the threshold voltage of the driving TFT.

During the emission period, the first capacitor is held at the second programming level. Further, the voltage of the third node falls to the low potential driving voltage variation amount and is held at the low potential driving voltage variation amount, and the voltages of the first and second nodes are boosted by a variation amount of the voltage of the third node, fall to a compensation level obtained by adding the second programming level stored in the first capacitor to the low potential driving voltage variation amount, and are held at the compensation level. Further, the voltage between the gate electrode and the source electrode of the driving TFT is held at the second programming level.

A first idle period is disposed prior to the address period and is defined by a period between a rising edge of the first gate pulse and a rising edge of the second gate pulse. The first gate pulse, which overlaps a second half part of a previous first gate pulse and overlaps a first half part of a next first gate pulse, is generated so as to perform a precharge operation during the first idle period.

A second idle period is disposed between the programming period and the emission period. A length of the second idle period increases by delaying a turn-on start time point of the emission pulse without changes in the driving current flowing in the OLED. A length of the programming period increases by delaying a turn-off start time point of the second gate pulse.

In another aspect, there is a stereoscopic image display comprising a display panel including a plurality of pixels, the display panel displaying left eye image data and right eye image data in a time division manner, and liquid crystal shutter glasses including a left eye shutter and a right eye shutter, which are alternately opened and closed in synchronization with the display panel, wherein each of the plurality of pixels includes an organic light emitting diode (OLED) configured to emit light using a driving current flowing between an input terminal of a high potential driving voltage and an input terminal of a low potential driving voltage, a driving thin film transistor (TFT) including a gate electrode connected to a first node and a source electrode connected to a third node, the driving TFT controlling the driving current based on a voltage between the gate electrode and the source electrode, a first switch TFT configured to switch on or off a current path between a data line and the first node in response to a first gate pulse of a pair of gate pulses, a second switch TFT configured to switch on or off a current path between the third node and the input terminal of the low potential driving voltage in response to the first gate pulse, a third switch TFT configured to switch on or off a current path between a reference voltage supply line and a second node in response to a second gate pulse of the pair of gate pulses, a fourth switch TFT configured to switch on or off a current path between the first node and the second node in response to an emission pulse, an emission TFT configured to switch on or off a current path between the third node and the input terminal of the low potential driving voltage in response to the emission pulse, a first capacitor connected between the second node and the third node, and a second capacitor connected between the first node and the second node.

The stereoscopic image display further comprises a data driver configured to drive data lines of the display panel, a gate driver configured to sequentially supply the plurality of pairs of gate pulses to a plurality of pairs of gate lines of the display panel, an emission driver configured to sequentially supply the emission pulse to emission lines of the display panel, and a control circuit configured to control a time assigned to a left eye frame for the left eye image data and a time assigned to a right eye frame for the right eye image data as a first period, control a time required to complete an addressing operation of the left eye image data or the right eye image data to the pixels as a second period shorter than the first period, and control a light emitting time of the pixels as a third period, which is shorter than the first period and is equal to or longer than the second period.

The control circuit controls the gate driver to thereby sequentially scan the pairs of gate pulses during the second period corresponding to a first half period of the first period and controls the data driver to thereby sequentially address the left eye image data or the right eye image data synchronized with the pairs of gate pulses to the pixels during the second period. The control circuit controls the emission driver to thereby start to scan the emission pulse from a middle time point of the second period and to complete the scanning of the emission pulse at an end time point of the second period and controls the light emitting time of the pixels as the third period, which overlaps a second half period of the second period and extends to a second half period of the first period. The control circuit allows the left eye shutter to be opened during the third period of the left eye frame and allows the right eye shutter be opened during the third period of the right eye frame. A length of the third period is longer than a length of the second period.

The control circuit controls the gate driver to thereby sequentially scan the pairs of gate pulses during the second period ranging from a start time point to ⅔ time point of the first period and controls the data driver to thereby sequentially address the left eye image data or the right eye image data synchronized with the pairs of gate pulses to the pixels during the second period. The control circuit controls the emission driver to thereby start to scan the emission pulse from a middle time point of the second period and to complete the scanning of the emission pulse at an end time point of the second period and controls the light emitting time of the pixels as the third period, which overlaps a second half period of the second period and ranges from ⅔ time point to an end time point of the first period. The control circuit allows the left eye shutter to be opened during the third period of the left eye frame and allows the right eye shutter be opened during the third period of the right eye frame. The third period substantially has the same length as the second period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the specific embodiments of the present invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the present invention.

Example embodiments of the present invention will be described with reference to FIGS. 5 to 17.

Figure 1:
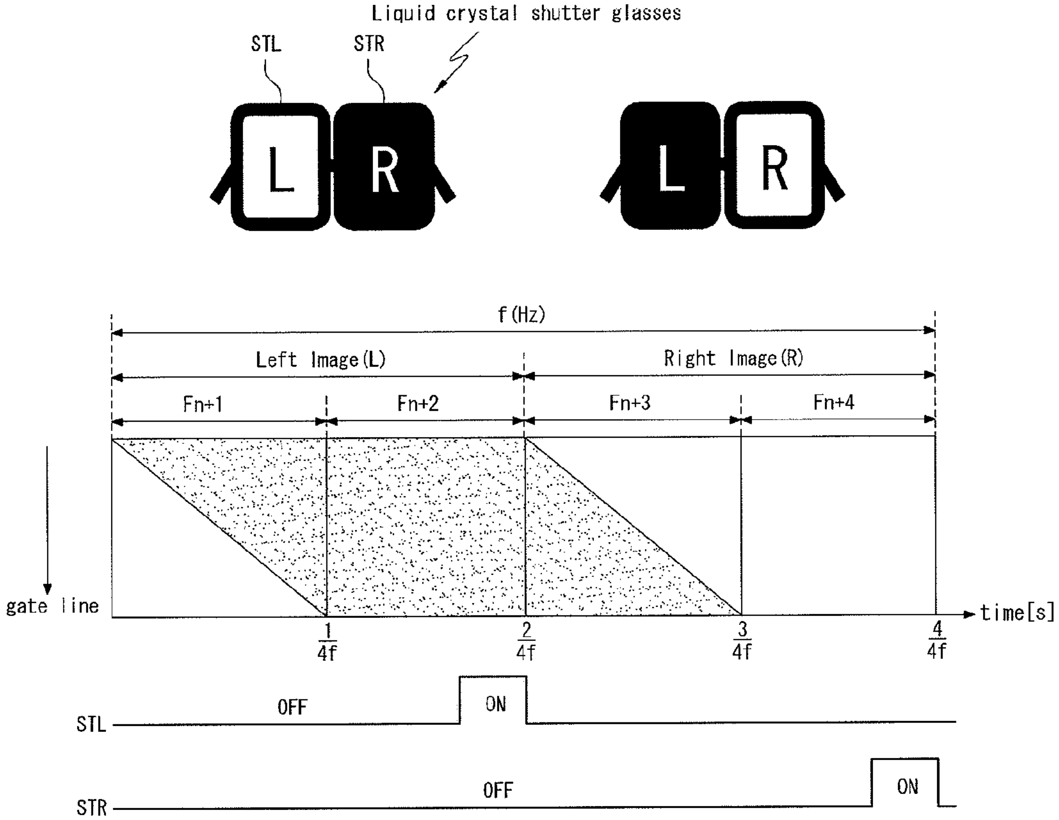
FIG. 1 (RELATED ART)
FIG. 1 illustrates an opening time of liquid crystal shutter glasses in a related art stereoscopic image display using a liquid crystal display as a display device.
Figure 2:
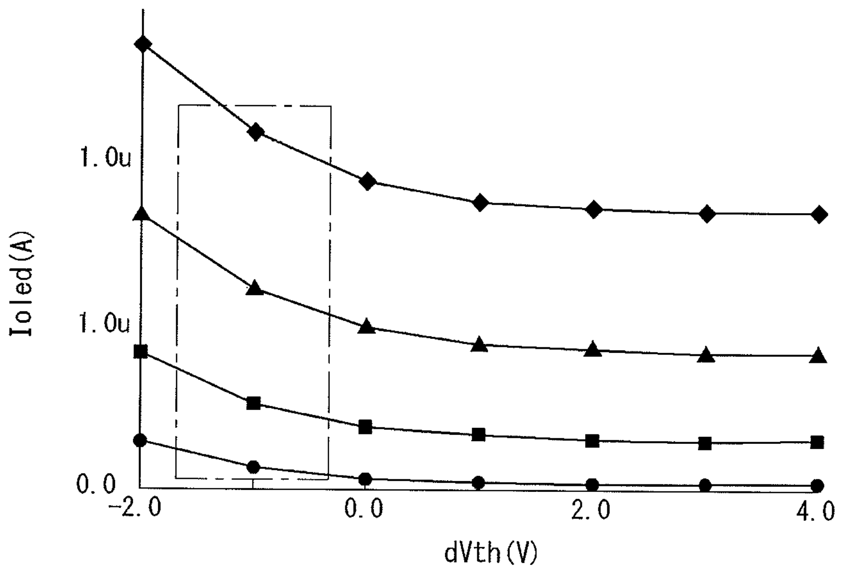
FIG. 2 (RELATED ART)
FIG. 2 illustrates changes in a driving current when a threshold voltage of a driving TFT is shifted to the negative direction.
Figure 3:
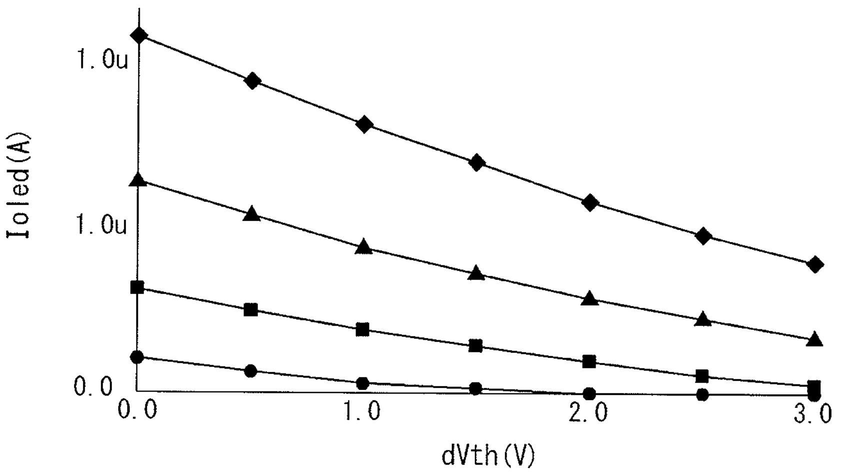
FIG. 3 (RELATED ART)
FIG. 3 illustrates changes in a driving current resulting from changes in a low potential driving voltage.
Figure 4:
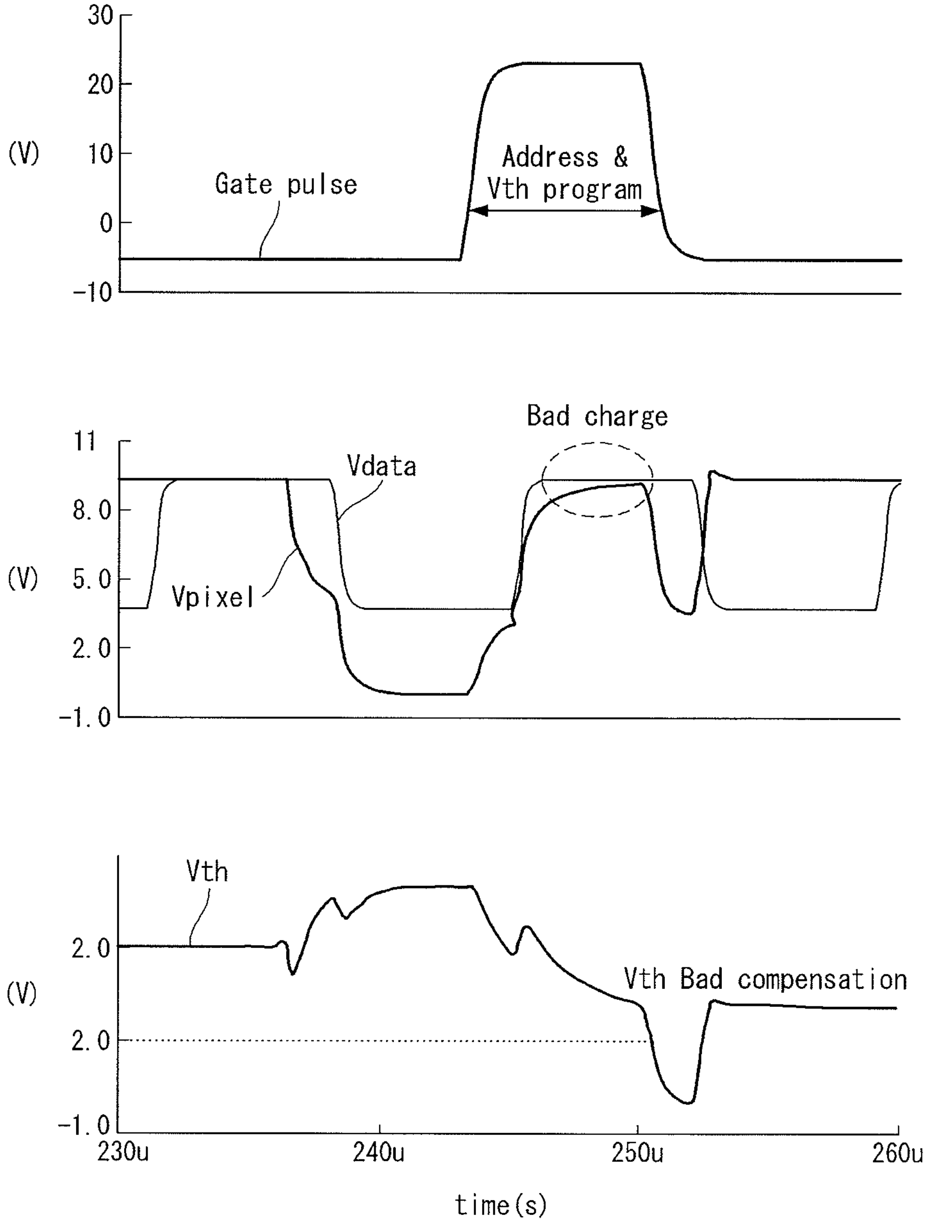
FIG. 4 (RELATED ART)
FIG. 4 illustrates the bad charge of a data voltage and the bad compensation of a threshold voltage in a high-speed driving method.
Figure 5:
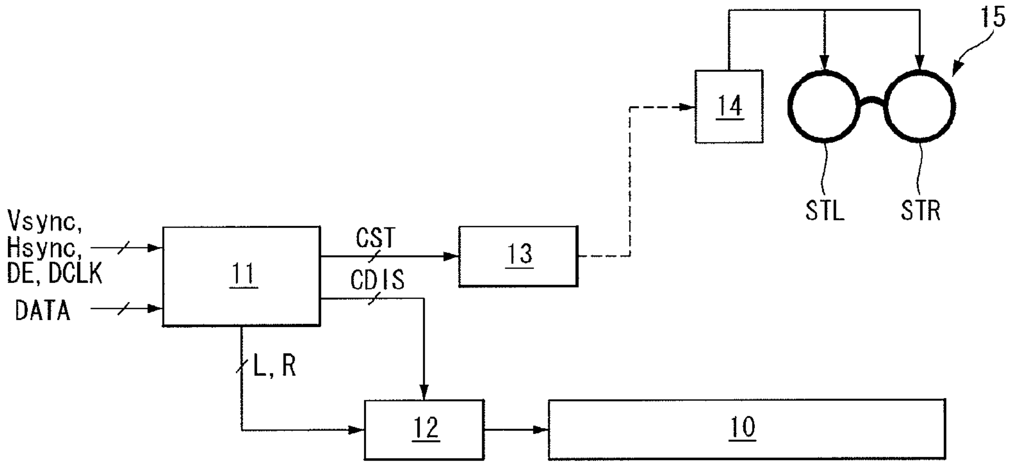
FIG. 5 illustrates a stereoscopic image display according to an example embodiment of the invention.
Figure 6:
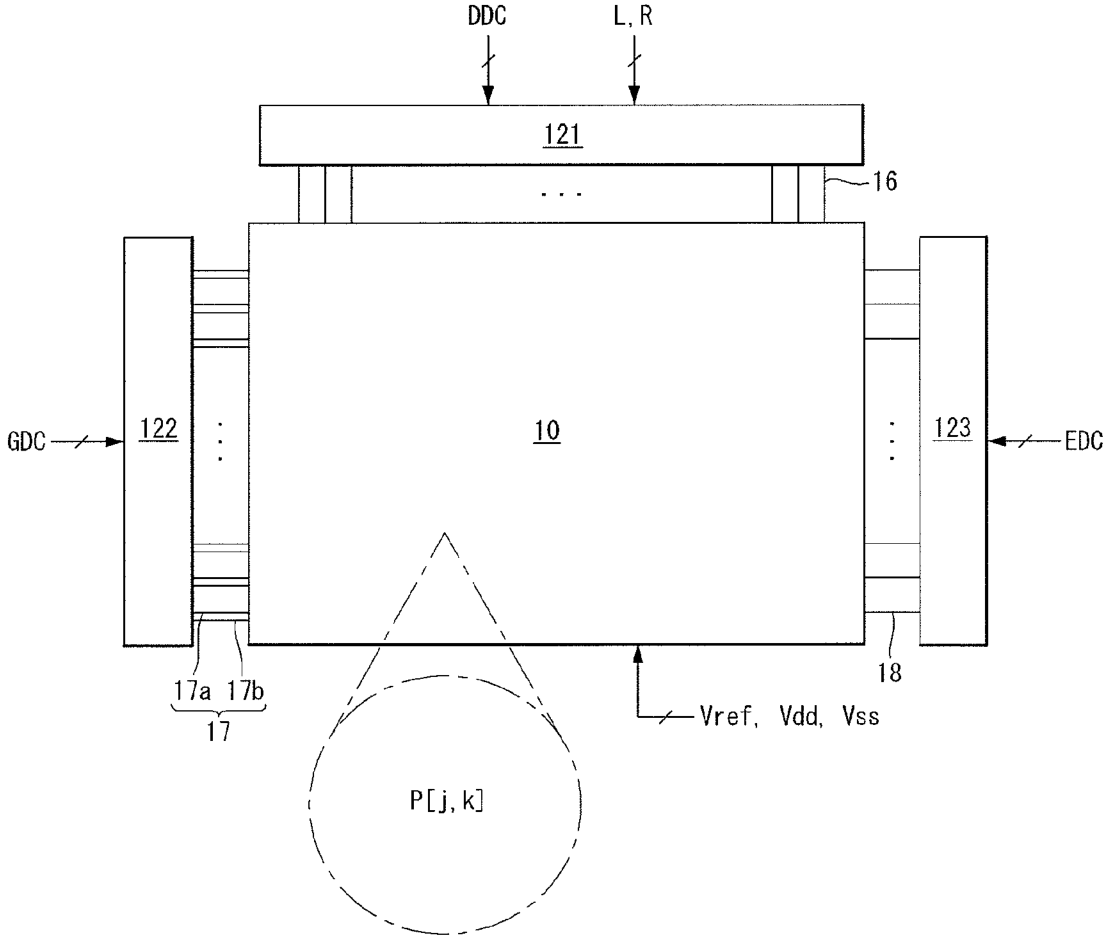
FIG. 6 illustrates an organic light emitting diode (OLED) display according to an example embodiment of the invention.
Figure 7:
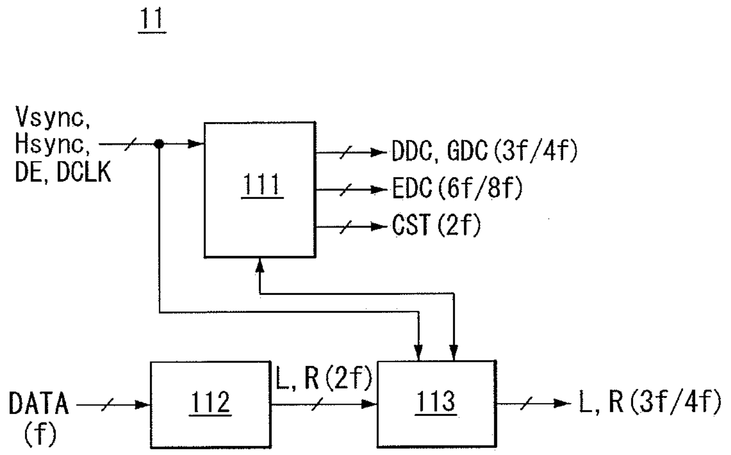
FIG. 7 illustrates a control circuit shown in FIG. 5.

FIGS. 5 and 6 illustrate a stereoscopic image display according to an example embodiment of the invention. FIG. 7 illustrates a control circuit shown in FIG. 5.

As shown in FIGS. 5 and 6, the stereoscopic image display according to the example embodiment of the invention uses an organic light emitting diode (OLED) display as a display device. The stereoscopic image display according to the example embodiment of the invention includes display devices 10 and 12, a control circuit 11, a shutter control signal transmitting unit 13, a shutter control signal receiving unit 14, and liquid crystal shutter glasses 15. The display devices 10 and 12 include a display panel 10 including an OLED and a display panel driving circuit 12.

A plurality of data lines 16, a plurality of pairs of gate lines 17, and a plurality of emission lines 18 are disposed on the display panel 10 to cross one another, and pixels P are respectively disposed at crossings of the lines 16, 17, and 18. Each of the pairs of gate lines 17 includes a first gate line 17*a* and a second gate line 17*b*. Each of the pixels P includes an OLED, which emits light using a driving current. The OLED includes an organic compound layer formed between an anode electrode and a cathode electrode. The organic compound layer includes a hole injection layer, a hole transport layer, a light emitting layer, an electron transport layer, and an electron injection layer. When a driving voltage is applied to the anode electrode and the cathode electrode, holes passing through the hole transport layer and electrons passing through the electron transport layer move to the light emitting layer to form excitons. As a result, the light emitting layer generates visible light.

Reference voltage supply lines (not shown) for supplying a reference voltage Vref to the pixels P and driving voltage supply lines (not shown) for supplying driving voltages Vdd and Vss to the pixels P are disposed on the display panel 10.

The display panel driving circuit 12 includes a data driver 121, a gate driver 122, and an emission driver 123. The data driver 121 converts left eye image data L and right eye image data R received from the control circuit 11 into an analog data voltage under the control of the control circuit 11 and supplies the analog data voltage to the data lines 16. The gate driver 122 sequentially supplies a plurality of pairs of gate pulses to the plurality of pairs of gate lines 17 under the control of the control circuit 11. The emission driver 123 sequentially supplies an emission pulse for controlling light emitting time points of the pixels P to the emission lines 18 under the control of the control circuit 11. The gate driver 122 and the emission driver 123 may be built in the display panel 10 based on a gate-in-panel (GIP) type.

The liquid crystal shutter glasses 15 include a left eye shutter STL and a right eye shutter STR which are separately controlled electrically. Each of the left eye shutter STL and the right eye shutter STR includes a first transparent substrate, a first transparent electrode formed on the first transparent substrate, a second transparent substrate, a second transparent electrode formed on the second transparent substrate, and a liquid crystal layer interposed between the first and second transparent substrates. A common voltage is supplied to the first transparent electrode, and an ON or OFF voltage is supplied to the second transparent electrode. When the ON voltage is supplied to the second transparent electrode in response to a shutter control signal CST, each of the left and right eye shutters STL and STR transmits light from the display panel 10. On the other hand, when the OFF voltage is supplied to the second transparent electrode in response to the shutter control signal CST, each of the left and right eye shutters STL and STR blocks the light from the display panel 10.

The shutter control signal transmitting unit 13 is connected to the control circuit 11 and transmits the shutter control signal CST received from the control circuit 11 to the shutter control signal receiving unit 14 via a wired/wireless interface. The shutter control signal receiving unit 14 is installed in the liquid crystal shutter glasses 15 and receives the shutter control signal CST via the wired/wireless interface. The shutter control signal receiving unit 14 alternately opens and closes the left eye shutter STL and the right eye shutter STR of the liquid crystal shutter glasses 15 in response to the shutter control signal CST. When the shutter control signal CST of a first logic value is generated, the left eye shutter STL of the liquid crystal shutter glasses 15 is open. When the shutter control signal CST of a second logic value is generated, the right eye shutter STR of the liquid crystal shutter glasses 15 is open.

The control circuit 11 receives timing signals and digital video data from a video source (not shown). The timing signals include a vertical sync signal Vsync, a horizontal sync signal Hsync, a data enable DE, a dot clock DCLK, and the like. The control circuit 11 separates the digital video data received from the video source into the left eye image data L and the right eye image data R and then supplies the left eye image data L and the right eye image data R to the data driver 121. The control circuit 11 controls a time assigned to a left eye frame for the left eye image data L and a time assigned to a right eye frame for the right eye image data R as a first period. The control circuit 11 controls a time required to complete an addressing operation of the left eye image data L or the right eye image data R to the pixels P as a second period shorter than the first period. The control circuit 11 controls a light emitting time of the pixels P in each frame as a third period, which is shorter than the first period and is equal to or longer than the second period. For this, the control circuit 11 multiplies an input frame frequency by N to obtain a frame frequency of (N×input frame frequency), where N is a positive integer equal to or greater than 2. The control circuit 11 generates a display panel control signal CDIS and the shutter control signal CST based on the frame frequency of (N×input frame frequency). The input frame frequency is 50 Hz in a phase alternate line (PAL) scheme and 60 Hz in a national television standards committee (NTSC) scheme.

The display panel control signal CDIS includes a data control signal DDC for controlling operation timing of the data driver 121, a gate control signal GDC for controlling operation timing of the gate driver 122, and an emission control signal EDC for controlling operation timing of the emission driver 123. The data control signal DDC and the gate control signal GDC are controlled at a predetermined speed, so that the addressing operation of data may be completed during the second period. The emission control signal EDC is controlled at a predetermined speed, so that the pixels P emit light during the third period while the left and right eye images do not overlap each other at a time when the left eye image changes into the right eye image or at a time when the right eye image changes into the left eye image. The shutter control signal CST is transmitted to the shutter control signal transmitting unit 13 and alternately opens and closes the left eye shutter STL and the right eye shutter STR of the liquid crystal shutter glasses 15 in a cycle of the first period.

As shown in FIG. 7, the control circuit 11 includes a control signal generator 111, a data separator 112, and a data controller 113.

The control signal generator 111 synchronizes each of the left and right eye frames with 2×frame frequency 2f. The control signal generator 111 synchronizes each of the data control signal DDC and the gate control signal GDC with 3×frame frequency 3f or 4×frame frequency 4f in each of the left and right eye frames. Further, the control signal generator 111 synchronizes the emission control signal EDC with 6×frame frequency 6f or 8×frame frequency 8f in each of the left and right eye frames. The control signal generator 111 synchronizes the shutter control signal CST with the 2×frame frequency 2f. The embodiment of the invention is advantageous in securing a luminance of the 3D image, because the emission control signal EDC is two times rapider than the gate control signal GDC.

The data separator 112 separates the digital video data synchronized with the input frame frequency f into the left eye image data L and the right eye image data R, thereby synchronizing each of the left eye image data L and the right eye image data R with the 2×frame frequency 2f.

The data controller 113 adjusts an addressing rate of data, so that the left eye image data L and the right eye image data R, which are input in synchronization with the 2×frame frequency 2f, may be supplied to the data driver 121 at the 3×frame frequency 3f or at the 4×frame frequency 4f.

Figure 8:
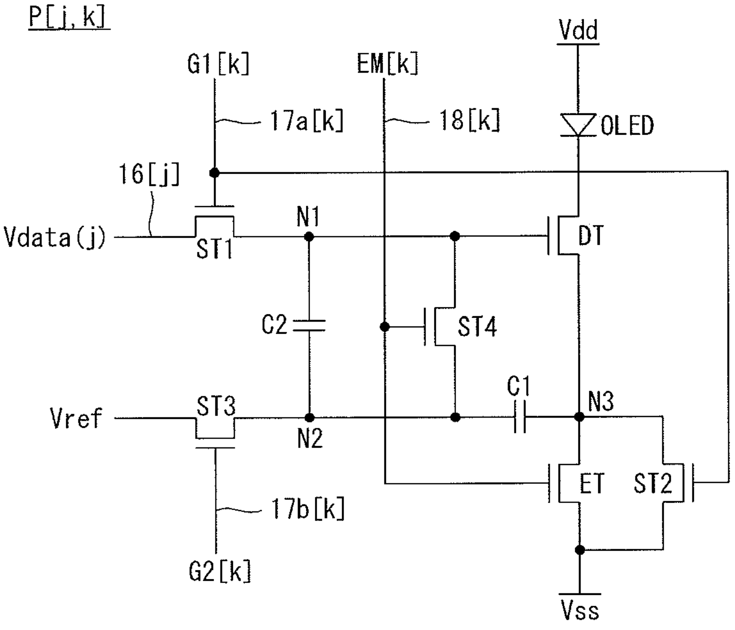
FIG. 8 is an equivalent circuit diagram of a pixel [j, k] shown in FIG. 6.

FIG. 8 is an equivalent circuit diagram of a pixel [j, k] shown in FIG. 6.

As shown in FIG. 8, in the pixels P arranged in a matrix form, a pixel P[j, k] arranged in a jth column and a kth row (where j and k are a positive integer) includes an OLED, a driving TFT DT, first to fourth switch TFTs ST1 to ST4, an emission TFT ET, and first and second capacitors C1 and C2.

All of the TFTs DT, ST1-ST4, and ET are implemented as an N-type metal-oxide semiconductor field effect transistor (MOSFET). The TFTs DT, ST1-ST4, and ET may have a negative threshold voltage because of their characteristics or may be one of an amorphous silicon (a-Si) TFT, a microcrystalline Si TFT, an organic TFT, and an oxide TFT each having a threshold voltage, that may be shifted under DC bias conditions.

The OLED is an inverted type OLED. More specifically, an anode electrode of the OLED is connected to an input terminal of a high potential driving voltage Vdd, and a cathode electrode of the OLED is connected to the driving TFT DT. The OLED emits light using a driving current and represents a gray level.

The driving TFT DT includes a gate electrode connected to a first node N1, a drain electrode connected to the cathode electrode of the OLED, and a source electrode connected to a third node N3. The driving TFT DT controls an amount of current flowing in the OLED based on a voltage between the gate electrode and the source electrode of the driving TFT DT.

The first switch TFT ST1 includes a gate electrode connected to a first gate line 17_a[k]_ of the kth row, a drain electrode connected to a data line 16[_j_] of the jth column, and a source electrode connected to the first node N1. The first switch TFT ST1 switches on or off a current path between the data line 16[_j_] of the jth column and the first node N1 in response to a first gate pulse G1[_k_] applied through the first gate line 17_a[k]_ of the kth row. When the first switch TFT ST1 is turned on, a data voltage Vdata[j] on the data line 16[_j]_ of the jth column is applied to the first node N1.

The second switch TFT ST2 includes a gate electrode connected to the first gate line 17_a[k]_ of the kth row, a drain electrode connected to the third node N3, and a source electrode connected to an input terminal of a low potential driving voltage Vss. The second switch TFT ST2 switches on or off a current path between the third node N3 and the input terminal of the low potential driving voltage Vss in response to the first gate pulse G1[_k_] applied through the first gate line 17_a[k]_ of the kth row.

The third switch TFT ST3 includes a gate electrode connected to a second gate line 17_b[k]_ of the kth row, a drain electrode connected to the reference voltage supply line, and a source electrode connected to a second node N2. The third switch TFT ST3 switches on or off a current path between the reference voltage supply line and the second node N2 in response to a second gate pulse G2[_k_] applied through the second gate line 17_b[k]_ of the kth row. When the third switch TFT ST3 is turned on, the reference voltage Vref on the reference voltage supply line is applied to the second node N2.

The fourth switch TFT ST4 includes a gate electrode connected to an emission line 18[_k_] of the kth row, a drain electrode connected to the first node N1, and a source electrode connected to the second node N2. The fourth switch TFT ST4 switches on or off a current path between the first node N1 and the second node N2 in response to an emission pulse EM[k] applied through the emission line 18[_k_] of the kth row.

The emission TFT ET includes a gate electrode connected to the emission line 18[_k_] of the kth row, a drain electrode connected to the third node N3, and a source electrode connected to the input terminal of the low potential driving voltage Vss. The emission TFT ET switches on or off a current path between the third node N3 and the input terminal of the low potential driving voltage Vss in response to the emission pulse EM[k] applied through the emission line 18[_k_] of the kth row.

The first capacitor C1 is connected between the second node N2 and the third node N3. The first capacitor C1 stores the threshold voltage of the driving TFT DT during a predetermined period.

The second capacitor C2 is connected between the first node N1 and the second node N2. The second capacitor C2 uniformly holds a potential of the first node N1, i.e., a gate potential of the driving TFT DT during a predetermined period.

Figure 9:
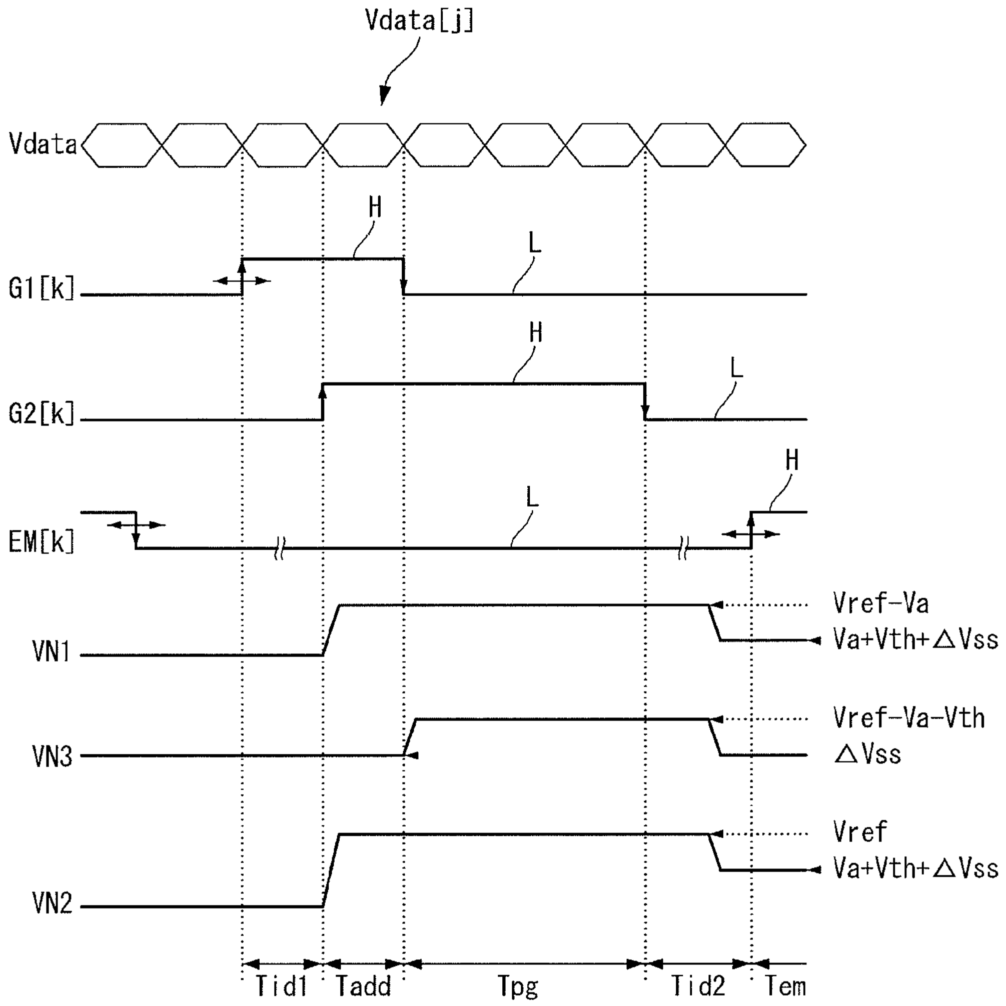
FIG. 9 illustrates a driving waveform of a pixel [j, k]
Figure 10A:
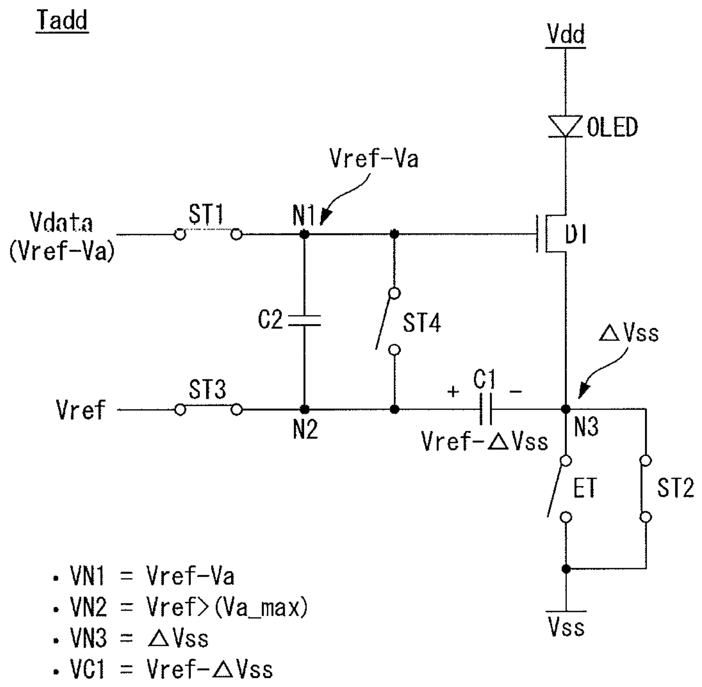
FIGS. 10A to 10C are equivalent circuit diagrams illustrating an operation state of a pixel in an address period, a programming period, and an emission period, respectively.
Figure 10B:
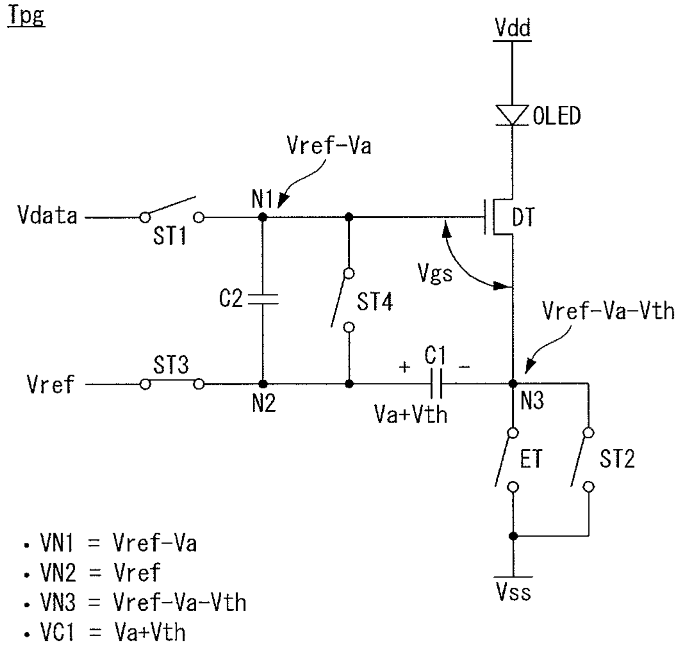
Figure 10C:
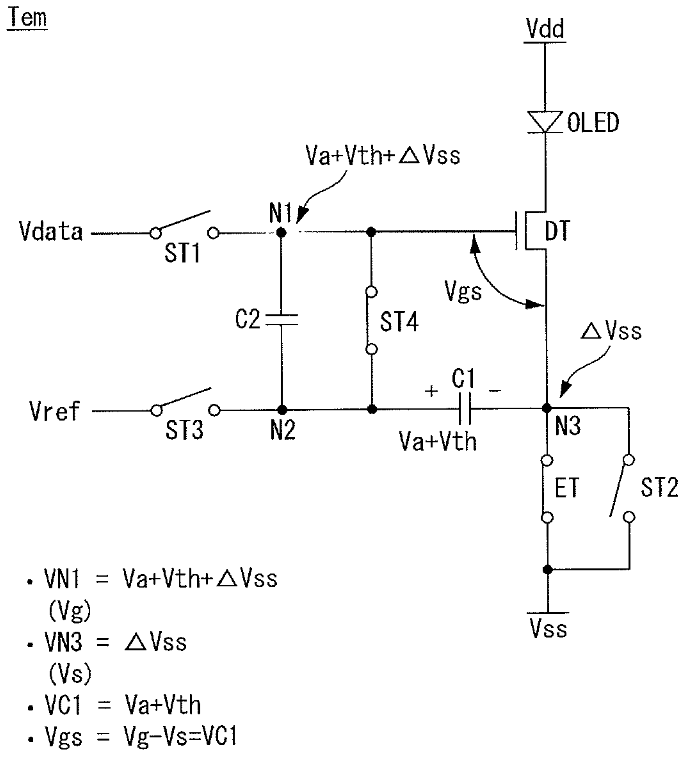

FIG. 9 illustrates a driving waveform of the pixel [j, k]. FIGS. 10A to 10C are equivalent circuit diagrams respectively illustrating an operation state of a pixel in an address period, a programming period, and an emission period.

As shown in FIG. 9, an address period Tadd indicates a period in which the first and second gate pulses G1[_k_] and G2[_k_] are held at a turn-on level (i.e., a high logic level H) and the emission pulse EM[k] is held at a turn-off level (i.e., a low logic level L). A programming period Tpg following the address period Tadd indicates a period in which the second gate pulse G2[_k_] is held at the high logic level H and the first gate pulse G1[_k_] and the emission pulse EM[k] are held at the low logic level L. An emission period Tem following the programming period Tpg indicates a period in which the first and second gate pulses G1[_k_] and G2[_k_] are held at the low logic level L and the emission pulse EM[k] is held at the high logic level H.

An operation state of the pixel is described below with reference to FIGS. 10A to 10C.

As shown in FIG. 10A, in the address period Tadd, the first and second switch TFTs ST1 and ST2 are turned on in response to the first gate pulse G1[_k_] of the high logic level H, the third switch TFT ST3 is turned on in response to the second gate pulse G2[_k_] of the high logic level H, and the fourth switch TFT ST4 and the emission TFT ET are turned off in response to the emission pulse EM[k] of the low logic level L.

The first node N1 is charged to the data voltage Vdata, the second node N2 is charged to the reference voltage Vref, and the third node N3 is charged to a variation amount ΔVss of the low potential driving voltage Vss. A user previously sets a potential of the data voltage Vdata to an addressing level (Vref−Va) obtained by subtracting a relatively low data adjustment voltage Va from the relatively high reference voltage Vref. In this instance, the first capacitor C1 stores a voltage difference between the second and third nodes N2 and N3, i.e., a value (Vref−ΔVss) obtained by subtracting the low potential driving voltage variation amount ΔVss from the reference voltage Vref.

As shown in FIG. 10B, in the programming period Tpg, the first and second switch TFTs ST1 and ST2 are turned off in response to the first gate pulse G1[_k_] of the low logic level L, the third switch TFT ST3 is turned on in response to the second gate pulse G2[_k_] of the high logic level H, and the fourth switch TFT ST4 and the emission TFT ET are turned off in response to the emission pulse EM[k] of the low logic level L.

A voltage VN1 of the first node N1 is held at the addressing level (Vref−Va) by the second capacitor C2, and a voltage VN2 of the second node N2 is held at the reference voltage Vref. In this instance, a voltage VN3 of the third node N3 gradually increases until a voltage difference Vgs between the gate electrode and the source electrode of the driving TFT DT reaches a threshold voltage Vth of the driving TFT DT. As a result, the voltage VN3 of the third node N3 increases to a first programming level (Vref−Va−Vth) obtained by subtracting the threshold voltage Vth of the driving TFT DT from the addressing level (Vref−Va) and is held at the first programming level (Vref−Va−Vth). The first capacitor C1 stores the voltage difference between the second and third nodes N2 and N3, i.e., a second programming level (Va+Vth) obtained by adding the data adjustment voltage Va to the threshold voltage Vth of the driving TFT DT.

As shown in FIG. 10C, in the emission period Tem, the first and second switch TFTs ST1 and ST2 are turned off in response to the first gate pulse G1[*k*] of the low logic level L, the third switch TFT ST3 is turned off in response to the second gate pulse G2[*k*] of the low logic level L, and the fourth switch TFT ST4 and the emission TFT ET are turned on in response to the emission pulse EM[k] of the high logic level H.

In the emission period Tem, the second programming level (Va+Vth) stored in the first capacitor C1 in the programming period Tpg is constantly held. Further, the voltage VN3 of the third node N3 falls to the low potential driving voltage variation amount ΔVss and is held at the low potential driving voltage variation amount ΔVss. The voltages VN1 and VN2 of the first and second nodes N1 and N2 are boosted by a variation amount of the voltage VN3 of the third node N3. More specifically, the voltages VN1 and VN2 of the first and second nodes N1 and N2 fall to a compensation level (Va+Vth+ΔVss) obtained by adding the second programming level (Va+Vth) stored in the first capacitor C1 to the low potential driving voltage variation amount ΔVss and are held at the compensation level (Va+Vth+ΔVss). The voltage difference Vgs between the gate and source electrodes of the driving TFT DT reaches the second programming level (Va+Vth) stored in the first capacitor C1.

As a result, a driving current Ioled represented by the following Equation 1 flows in the OLED.

[Equation 1]

$$
\begin{aligned}
Ioled &= \frac{1}{2}\cdot\mu\cdot C_{ox}\cdot\frac{W}{L}(Vgs - Vth)^2 && \text{(A)}\\
&= \frac{1}{2}\cdot\mu\cdot C_{ox}\cdot\frac{W}{L}(Va + Vth - Vth)^2 && \text{(B)}\\
&= \frac{1}{2}\cdot\mu\cdot C_{ox}\cdot\frac{W}{L}(Va)^2 && \text{(C)}
\end{aligned}
$$

In the above Equation 1, 'μ' denotes a mobility of the driving TFT DT, 'Cox' a parasitic capacitance of the driving TFT DT, 'W' a channel width of the driving TFT DT, 'L' a channel length of the driving TFT DT, 'Vgs' the voltage difference between the gate and source electrodes of the driving TFT DT, 'Vth' the threshold voltage of the driving TFT DT, and 'Va' the data adjustment voltage.

Figure 11:
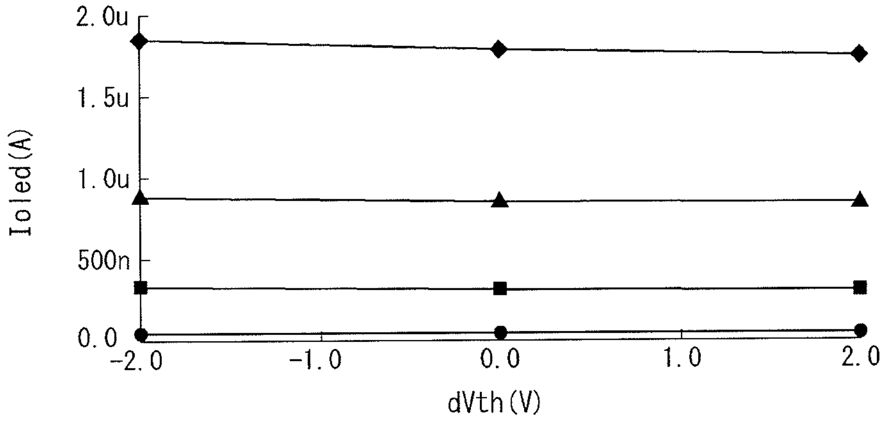
FIG. 11 is a simulation waveform diagram showing that a driving current flowing in an OLED does not depend on a difference between threshold voltages of driving TFTs of pixels.
Figure 12:
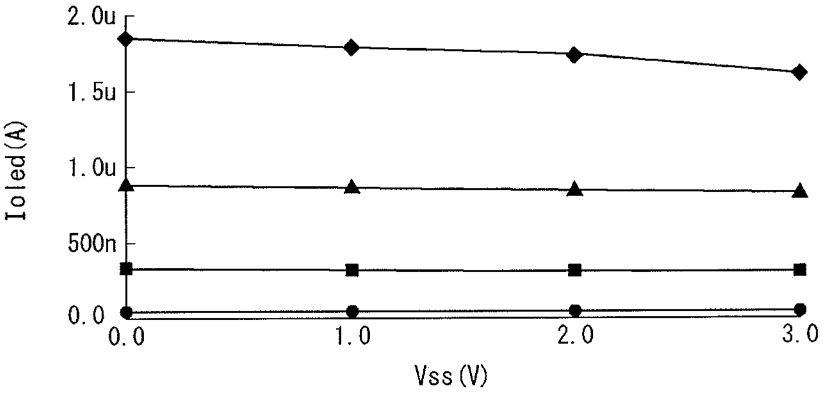
FIG. 12 is a simulation waveform diagram showing that a driving current flowing in an OLED does not depend on a difference between low potential driving voltages of pixels.

(C) of the above Equation 1 does not include the factors of 'Vth' and 'ΔVss'. This indicates that the driving current Ioled flowing in the OLED does not depend on a difference between the threshold voltages Vth of the driving TFTs DT of the pixels P and a difference between the low potential driving voltages Vss of the pixels P as shown in FIGS. 11 and 12. As a result, although the threshold voltages Vth of the driving TFTs DT of the pixels P and/or the low potential driving voltages Vss of the pixels P change, a luminance difference between the pixels P resulting from the changes in the threshold voltages Vth and/or the low potential driving voltages Vss is not generated. In particular, because the threshold voltages Vth of the driving TFTs DT in the pixel structure according to the embodiment of the invention are compensated using a known diode-connection method and other methods, both the positive shift and the negative shift of the threshold voltage Vth may be completed compensated.

Figure 13:
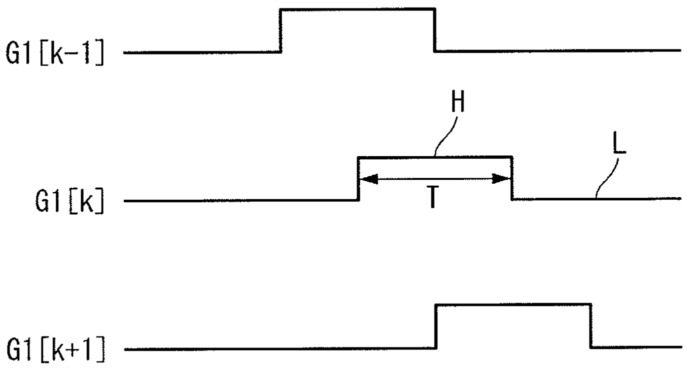
FIG. 13 is a waveform diagram illustrating an overlap drive between adjacent first gate pulses.

As shown in FIG. 9, a first idle period Tid1 prior to the address period Tadd is defined by a period between a rising edge of the first gate pulse G1[*k*] and a rising edge of the second gate pulse G2[*k*]. A length of the first idle period Tid1 may increase by advancing the generation of the rising edge of the first gate pulse G1[*k*]. The first idle period Tid1 serves as a precharge period, thereby substantially preventing a bad charge of the data voltage Vdata in the high-speed drive. To perform an operation of the precharge period, as shown in FIG. 13, the first gate pulse G1[*k*] applied to the first gate line of the kth row overlaps a second half part of a first gate pulse G1[*k*−1] applied to a first gate line of a (k−1)th row and also overlaps a first half part of a first gate pulse G1[*k*+1] applied to a first gate line of a (k+1)th row. A time T required in the charge of the data voltage Vdata lengthens due to such an overlap drive, as compared the related art.

Figure 14:
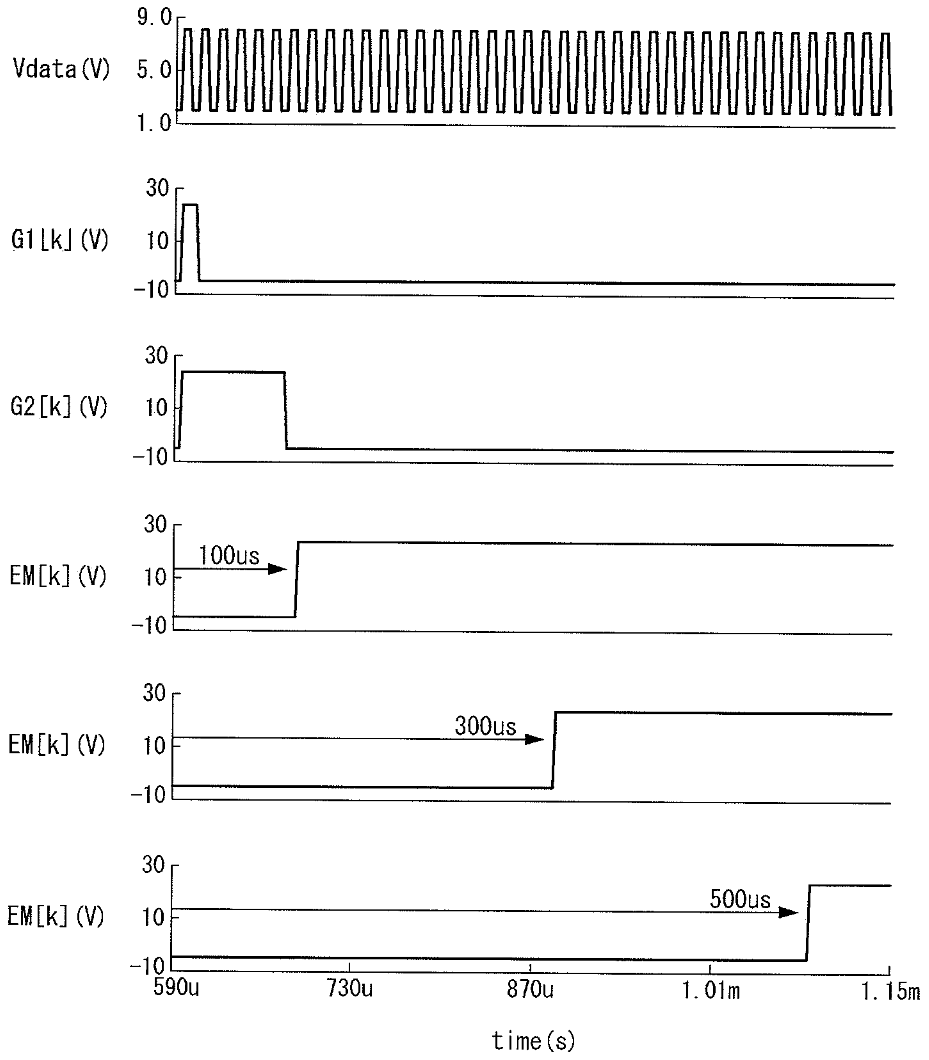
FIG. 14 illustrates an example of gradually delaying a time point of a rising edge of an emission pulse.
Figure 15:
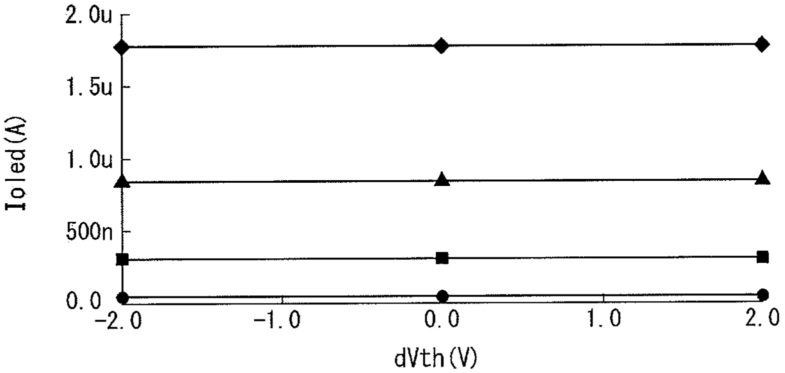
FIG. 15 is a simulation waveform diagram illustrating changes in a driving current flowing in an OLED corresponding to changes in a time point of a rising edge of an emission pulse.

A second idle period Tid2 between the programming period Tpg and the emission period Tem is defined by a period between a falling edge of the second gate pulse G2[*k*] and a rising edge of the emission pulse EM[k]. A length of the second idle period Tid2 may increase by delaying the generation of the rising edge of the emission pulse EM[k]. According to the pixel structure according to the embodiment of the invention, although the length of the second idle period Tid2 may increase by gradually delaying a generation time point (i.e., a turn-on start time point) of the rising edge of the emission pulse EM[k] in order of 100 μs, 300 μs, and 500 μs as shown in FIG. 14, the driving current Ioled flowing in the OLED does not change as shown in FIG. 15. Thus, the embodiment of the invention delays a generation time point (i.e., a turn-off start time point) of the falling edge of the second gate pulse G2[*k*] in a state where the length of the second idle period Tid2 is properly adjusted as described above, and arranges the turn-off start time point within the widened second idle period Tid2, thereby widening a length of the programming period Tpg. As a result, a bad compensation resulting from an insufficient length of a compensation period of the threshold voltage Vth may be prevented in the high-speed drive.

Figure 16:
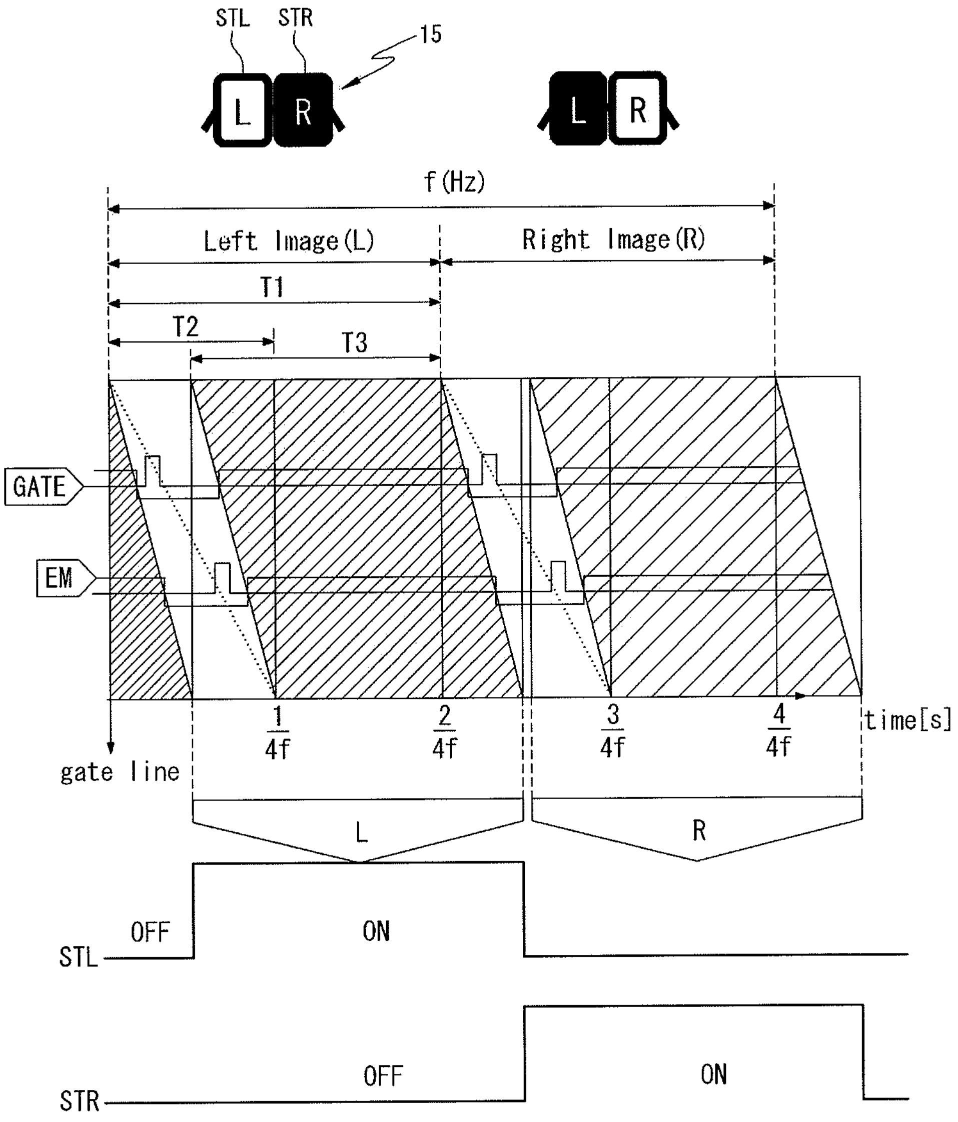
FIG. 16 illustrates a first driving example of a stereoscopic image display including an OLED display.

FIG. 16 illustrates a first driving example of the stereoscopic image display including the OLED display according to the embodiment of the invention.

As shown in FIG. 16, the control circuit 11 controls a time assigned to a left eye frame for the left eye image data L and a time assigned to a right eye frame for the right eye image data R as a first period T1. When the input frame frequency 'f' is 60 Hz, the first period T1 is about 8.3 ms (1 s/120).

The control circuit 11 controls the gate driver, thereby sequentially scanning a pair of gate pulses GATE during a second period T2 corresponding to a first half period of the first period T1. The control circuit 11 controls the data driver, thereby sequentially addressing the left eye image data L or the right eye image data R synchronized with the pair of gate pulses GATE to the pixels during the second period T2. When the input frame frequency 'f' is 60 Hz, the second period T2 is about 4.17 ms (1 s/240). The addressing of data and the programming of the threshold voltage are performed during the second period T2.

The control circuit 11 controls the emission period of the pixels as a third period T3, which overlaps a second half period of the second period T2 and extends to a second half period of the first period T1. When the input frame frequency 'f' is 60 Hz, the third period T3 is about 6.25 ms (3 s/480). In this instance, the control circuit 11 controls the emission driver, so that the left and right eye images are not mixed with each other at a time when the left and right eye images change into each other, thereby completing the sequential scanning of an emission pulse EM during an overlap period between the second period T2 and the third period T3. Namely, the control circuit 11 starts to scan the emission pulse EM from a middle time point of the second period T2 and completes the scanning of the emission pulse EM at an end time point of the second period T2. The scanning of the emission pulse EM is performed about two times faster than the scanning of the pair of gate pulses GATE.

The control circuit 11 allows the left eye shutter STL to be opened during the third period T3 of the left eye frame and allows the right eye shutter STR be opened during the third period T3 of the right eye frame.

As described above, the stereoscopic image display according to the embodiment of the invention corresponds a time required in the sequential addressing of data (i.e., the sequential scanning of the pair of gate pulses) to 4×frame frequency 4f and also corresponds a time required in the sequential scanning of the emission pulse to 8×frame frequency 8f, thereby lengthening a light emission period of the pixels. Hence, the luminance reduction of the 3D image may be minimized. Further, because the scanning of the emission pulse is completed during the overlap period between the second period T2 and the third period T3, the overlap between the left and right eye images is prevented at a time when the left eye image changes into the right eye image or at a time when the right eye image changes into the left eye image. As a result, the 3D crosstalk may be greatly reduced.

Figure 17:
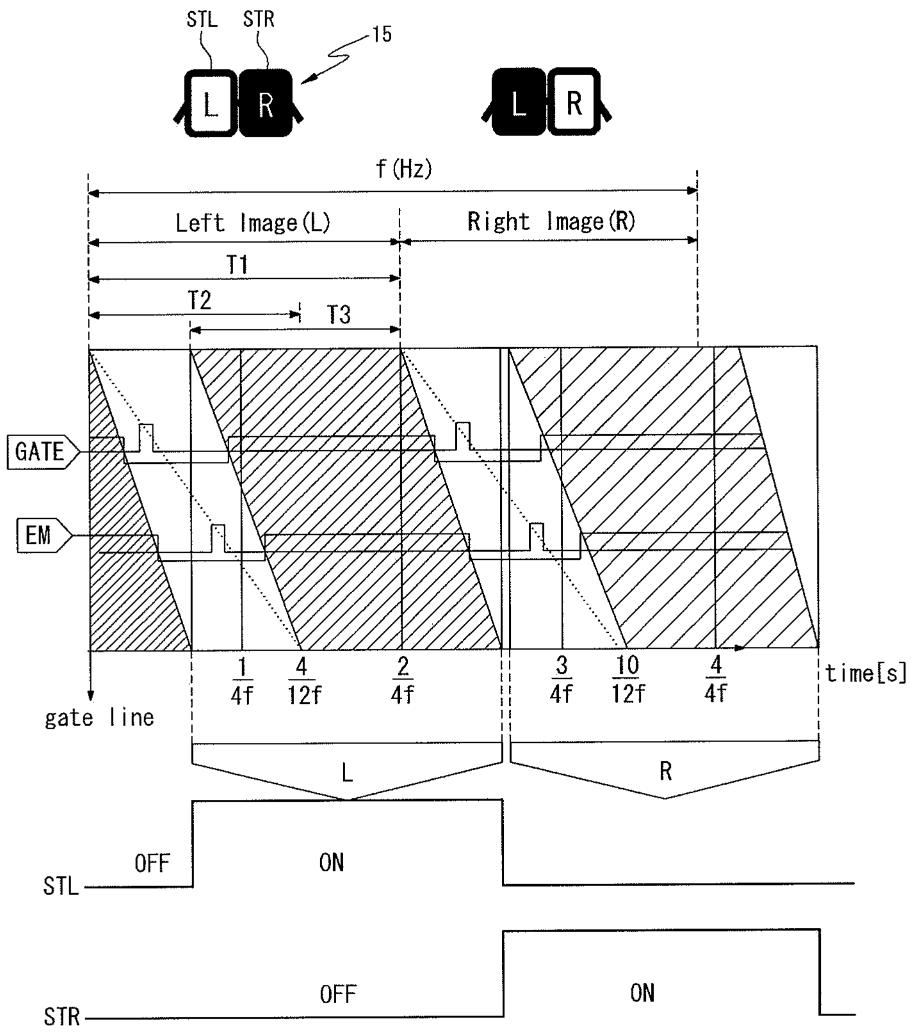
FIG. 17 illustrates a second driving example of a stereoscopic image display including an OLED display.

FIG. 17 illustrates a second driving example of the stereoscopic image display including the OLED display according to the embodiment of the invention.

As shown in FIG. 17, the control circuit 11 controls a time assigned to a left eye frame for the left eye image data L and a time assigned to a right eye frame for the right eye image data R as a first period T1. When the input frame frequency 'f' is 60 Hz, the first period T1 is about 8.3 ms (1 s/120).

The control circuit 11 controls the gate driver, thereby sequentially scanning a pair of gate pulses GATE during a second period T2 ranging from a start time point to ⅔ time point of the first period T1. The control circuit 11 controls the data driver, thereby sequentially addressing the left eye image data L or the right eye image data R synchronized with the pair of gate pulses GATE to the pixels during the second period T2. When the input frame frequency 'f' is 60 Hz, the second period T2 is about 5.56 ms (1 s/180). The addressing of data and the programming of the threshold voltage are performed during the second period T2.

The control circuit 11 controls the emission period of the pixels as a third period T3, which overlaps a second half period of the second period T2 and ranges from ⅔ time point to an end time point of the first period T1. The third period T3 substantially has the same length as the second period T2. In this instance, the control circuit 11 controls the emission driver, so that the left and right eye images are not mixed with each other at a time when the left and right eye images change into each other, thereby completing the sequential scanning of an emission pulse EM during an overlap period between the second period T2 and the third period T3. Namely, the control circuit 11 starts to scan the emission pulse EM from a middle time point of the second period T2 and completes the scanning of the emission pulse EM at an end time point of the second period T2. The scanning of the emission pulse EM is performed about two times faster than the scanning of the pair of gate pulses GATE.

The control circuit 11 allows the left eye shutter STL to be opened during the third period T3 of the left eye frame and allows the right eye shutter STR be opened during the third period T3 of the right eye frame.

As described above, the stereoscopic image display according to the embodiment of the invention corresponds a time required in the sequential addressing of data (i.e., the sequential scanning of the pair of gate pulses) to 3×frame frequency 3f and also corresponds a time required in the sequential scanning of the emission pulse to 6×frame frequency 6f, thereby lengthening a light emission period of the pixels. Hence, the luminance reduction of the 3D image may be minimized. Further, because the scanning of the emission pulse is completed during the overlap period between the second period T2 and the third period T3, the overlap between the left and right eye images is prevented at a time when the left eye image changes into the right eye image or at a time when the right eye image changes into the left eye image. As a result, the 3D crosstalk may be greatly reduced. Furthermore, because the second driving example illustrated in FIG. 17 corresponds the second period T2 required in the sequential addressing of data to the frame frequency lower than the first driving example illustrated in FIG. 16, an increase in the circuit cost resulting from the high-speed drive may be reduced.

As described above, the OLED display and the stereoscopic image display using the OLED display according to the embodiment of the invention controls a gate scanning rate and an emission scanning rate differently from each other, thereby reducing the 3D crosstalk and minimizing the luminance reduction. Furthermore, the OLED display and the stereoscopic image display using the OLED display according to the embodiment of the invention may efficiently compensate for changes (including the positive shift and the negative shift) in the threshold voltage of the driving TFT and changes in the low potential driving voltages. Furthermore, the OLED display and the stereoscopic image display using the OLED display according to the embodiment of the invention separates signal lines for controlling the overlap drive and the storage of the threshold voltage, thereby preventing the bad charge of the data voltage and the bad compensation of the threshold voltage in the high-speed drive.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An organic light emitting diode (OLED) display comprising:

an organic light emitting diode (OLED) configured to emit light using a driving current flowing between an input terminal of a high potential driving voltage and an input terminal of a low potential driving voltage;

a driving thin film transistor (TFT) including a gate electrode connected to a first node and a source electrode connected to a third node, the driving TFT controlling the driving current based on a voltage between the gate electrode and the source electrode;

a first switch TFT configured to switch on or off a current path between a data line and the first node in response to a first gate pulse of a pair of gate pulses;

a second switch TFT configured to switch on or off a current path between the third node and the input terminal of the low potential driving voltage in response to the first gate pulse;

a third switch TFT configured to switch on or off a current path between a reference voltage supply line and a second node in response to a second gate pulse of the pair of gate pulses;

a fourth switch TFT configured to switch on or off a current path between the first node and the second node in response to an emission pulse;

an emission TFT configured to switch on or off a current path between the third node and the input terminal of the low potential driving voltage in response to the emission pulse;

a first capacitor connected between the second node and the third node; and a second capacitor connected between the first node and the second node.

2. The OLED display of claim 1, wherein during an address period, the first and second gate pulses are held at a turn-on level, and the emission pulse is held at a turn-off level, wherein during a programming period following the address period, the second gate pulse is held at the turn-on level, and the first gate pulse and the emission pulse are held at the turn-off level, wherein during an emission period following the programming period, the first and second gate pulses are held at the turn-off level, and the emission pulse is held at the turn-on level.

3. The OLED display of claim 2, wherein during the address period, the first node is charged to a data voltage, the second node is charged to a reference voltage, and the third node is charged to a variation amount of the low potential driving voltage, wherein during the address period, the first capacitor stores a value obtained by subtracting the low potential driving voltage variation amount from the reference voltage, wherein during the address period, a potential of the data voltage is previously set to an addressing level obtained by subtracting a relatively low data adjustment voltage from the reference voltage.

4. The OLED display of claim 3, wherein during the programming period, a voltage of the first node is held at the addressing level by the second capacitor, a voltage of the second node is held at the reference voltage, and a voltage of the third node increases to a first programming level obtained by subtracting a threshold voltage of the driving TFT from the addressing level and is held at the first programming level, wherein during the programming period, the first capacitor stores a second programming level obtained by adding the data adjustment voltage to the threshold voltage of the driving TFT.

5. The OLED display of claim 4, wherein during the emission period, the first capacitor is held at the second programming level, wherein during the emission period, the voltage of the third node falls to the low potential driving voltage variation amount and is held at the low potential driving voltage variation amount, and the voltages of the first and second nodes are boosted by a variation amount of the voltage of the third node, fall to a compensation level obtained by adding the second programming level stored in the first capacitor to the low potential driving voltage variation amount, and are held at the compensation level, wherein during the emission period, the voltage between the gate electrode and the source electrode of the driving TFT is held at the second programming level.

6. The OLED display of claim 2, wherein a first idle period is disposed prior to the address period and is defined by a period between a rising edge of the first gate pulse and a rising edge of the second gate pulse, wherein the first gate pulse, which overlaps a second half part of a previous first gate pulse and overlaps a first half part of a next first gate pulse, is generated so as to perform a precharge operation during the first idle period.

7. The OLED display of claim 2, wherein a second idle period is disposed between the programming period and the emission period, wherein a length of the second idle period increases by delaying a turn-on start time point of the emission pulse without changes in the driving current flowing in the OLED, wherein a length of the programming period increases by delaying a turn-off start time point of the second gate pulse.

8. A stereoscopic image display comprising:

a display panel including a plurality of pixels, the display panel displaying left eye image data and right eye image data in a time division manner; and liquid crystal shutter glasses including a left eye shutter and a right eye shutter, which are alternately opened and closed in synchronization with the display panel, wherein each of the plurality of pixels includes:

an organic light emitting diode (OLED) configured to emit light using a driving current flowing between an input terminal of a high potential driving voltage and an input terminal of a low potential driving voltage;

a driving thin film transistor (TFT) including a gate electrode connected to a first node and a source electrode connected to a third node, the driving TFT controlling the driving current based on a voltage between the gate electrode and the source electrode;

a first switch TFT configured to switch on or off a current path between a data line and the first node in response to a first gate pulse of a pair of gate pulses;

a second switch TFT configured to switch on or off a current path between the third node and the input terminal of the low potential driving voltage in response to the first gate pulse;

a third switch TFT configured to switch on or off a current path between a reference voltage supply line and a second node in response to a second gate pulse of the pair of gate pulses;

a fourth switch TFT configured to switch on or off a current path between the first node and the second node in response to an emission pulse;

an emission TFT configured to switch on or off a current path between the third node and the input terminal of the low potential driving voltage in response to the emission pulse;

a first capacitor connected between the second node and the third node; and a second capacitor connected between the first node and the second node.

9. The stereoscopic image display of claim 8, wherein during an address period, the first and second gate pulses are held at a turn-on level, and the emission pulse is held at a turn-off level, wherein during a programming period following the address period, the second gate pulse is held at the turn-on level, and the first gate pulse and the emission pulse are held at the turn-off level, wherein during an emission period following the programming period, the first and second gate pulses are held at the turn-off level, and the emission pulse is held at the turn-on level.

10. The stereoscopic image display of claim 9, wherein during the address period, the first node is charged to a data voltage, the second node is charged to a reference voltage, and the third node is charged to a variation amount of the low potential driving voltage, wherein during the address period, the first capacitor stores a value obtained by subtracting the low potential driving voltage variation amount from the reference voltage, wherein during the address period, a potential of the data voltage is previously set to an addressing level obtained by subtracting a relatively low data adjustment voltage from the reference voltage.

11. The stereoscopic image display of claim 10, wherein during the programming period, a voltage of the first node is held at the addressing level by the second capacitor, a voltage of the second node is held at the reference voltage, and a voltage of the third node increases to a first programming level obtained by subtracting a threshold voltage of the driving TFT from the addressing level and is held at the first programming level, wherein during the programming period, the first capacitor stores a second programming level obtained by adding the data adjustment voltage to the threshold voltage of the driving TFT.

12. The stereoscopic image display of claim 11, wherein during the emission period, the first capacitor is held at the second programming level, wherein during the emission period, the voltage of the third node falls to the low potential driving voltage variation amount and is held at the low potential driving voltage variation amount, and the voltages of the first and second nodes are boosted by a variation amount of the voltage of the third node, fall to a compensation level obtained by adding the second programming level stored in the first capacitor to the low potential driving voltage variation amount, and are held at the compensation level, wherein during the emission period, the voltage between the gate electrode and the source electrode of the driving TFT is held at the second programming level.

13. The stereoscopic image display of claim 9, wherein a first idle period is disposed prior to the address period and is defined by a period between a rising edge of the first gate pulse and a rising edge of the second gate pulse, wherein the first gate pulse, which overlaps a second half part of a previous first gate pulse and overlaps a first half part of a next first gate pulse, is generated so as to perform a precharge operation during the first idle period.

14. The stereoscopic image display of claim 9, wherein a second idle period is disposed between the programming period and the emission period, wherein a length of the second idle period increases by delaying a turn-on start time point of the emission pulse without changes in the driving current flowing in the OLED, wherein a length of the programming period increases by delaying a turn-off start time point of the second gate pulse.

15. The stereoscopic image display of claim 8, further comprising:

a data driver configured to drive data lines of the display panel;

a gate driver configured to sequentially supply the plurality of pairs of gate pulses to a plurality of pairs of gate lines of the display panel;

an emission driver configured to sequentially supply the emission pulse to emission lines of the display panel; and a control circuit configured to control a time assigned to a left eye frame for the left eye image data and a time assigned to a right eye frame for the right eye image data as a first period, control a time required to complete an addressing operation of the left eye image data or the right eye image data to the pixels as a second period shorter than the first period, and control a light emitting time of the pixels as a third period, which is shorter than the first period and is equal to or longer than the second period.

16. The stereoscopic image display of claim 15, wherein the control circuit controls the gate driver to thereby sequentially scan the pairs of gate pulses during the second period corresponding to a first half period of the first period and controls the data driver to thereby sequentially address the left eye image data or the right eye image data synchronized with the pairs of gate pulses to the pixels during the second period, wherein the control circuit controls the emission driver to thereby start to scan the emission pulse from a middle time point of the second period and to complete the scanning of the emission pulse at an end time point of the second period and controls the light emitting time of the pixels as the third period, which overlaps a second half period of the second period and extends to a second half period of the first period, wherein the control circuit allows the left eye shutter to be opened during the third period of the left eye frame and allows the right eye shutter be opened during the third period of the right eye frame, wherein a length of the third period is longer than a length of the second period.

17. The stereoscopic image display of claim 15, wherein the control circuit controls the gate driver to thereby sequentially scan the pairs of gate pulses during the second period ranging from a start time point to ⅔ time point of the first period and controls the data driver to thereby sequentially address the left eye image data or the right eye image data synchronized with the pairs of gate pulses to the pixels during the second period, wherein the control circuit controls the emission driver to thereby start to scan the emission pulse from a middle time point of the second period and to complete the scanning of the emission pulse at an end time point of the second period and controls the light emitting time of the pixels as the third period, which overlaps a second half period of the second period and ranges from ⅔ time point to an end time point of the first period, wherein the control circuit allows the left eye shutter to be opened during the third period of the left eye frame and allows the right eye shutter be opened during the third period of the right eye frame, wherein the third period substantially has the same length as the second period.

* * * * *